United States Patent [19]
Manor

[11] 3,817,557
[45] June 18, 1974

[54] OVERLOAD RELEASE MECHANISM FOR THREE-POINT HITCH DEVICE ON TRACTORS

[75] Inventor: Gedalyahu Manor, Haifa, Israel

[73] Assignee: Technion Research and Development Foundation, Ltd., Haifa, Israel

[22] Filed: Mar. 6, 1972

[21] Appl. No.: 232,229

[30] Foreign Application Priority Data
Mar. 5, 1971   Israel.................................... 36358

[52] U.S. Cl............................. 280/452, 280/461 A
[51] Int. Cl........................................ B62d 53/00
[58] Field of Search........ 280/452, 449, 455, 461 R, 280/461 A

[56] References Cited
UNITED STATES PATENTS

| | | | |
|---|---|---|---|
| 2,227,231 | 12/1940 | Schnuelle | 280/452 |
| 2,541,356 | 2/1951 | Hansmann | 280/452 |
| 3,341,225 | 9/1967 | Bultheel | 280/449 |
| 3,347,560 | 10/1967 | Hodges | 280/449 X |
| 3,447,816 | 6/1969 | Shannon | 280/452 |
| 3,572,759 | 3/1971 | Baugh | 280/461 A |

*Primary Examiner*—Leo Friaglia
*Attorney, Agent, or Firm*—Flynn & Frishauf

[57] ABSTRACT

To prevent twist on the hitches of a three-point hitch if an implement pulled by a tractor meets an obstruction and one hitch releases, the retaining levers on the outer hitches are interconnected by a force transmission element which includes a quick-release snap, or toggle acting device to reduce the retaining force on both levers if one trips out. The force transmitting device may be a linkage with a spring-loaded toggle, a hydraulic interconnection with a bleeder valve acting against compressed air, magnetically coupled links or the like.

8 Claims, 7 Drawing Figures

OVERLOAD RELEASE MECHANISM FOR THREE-POINT HITCH DEVICE ON TRACTORS

This invention relates to mechanisms for coupling agricultural implements to tractors. More especially it relates to a mechanism for the quick-acting release of the implement upon heavy stress being caused due to overload.

With the ever-increasing traction force of agricultural tractors, the width of the implements hitched thereto, such as harrows, smoothers, rakes, etc., has increased proportionally, so that a width of 8 m. is not unusual today. On the other hand the hitching of these implements is almost exclusively accomplished by way of the three-point hitch, wherein the points of attachment are at a relatively small distance from each other and generally less than the wheel track. This results in very high stresses in the implements and the coupling members whenever the implement meets an obstacle or obstruction on one side only, often leading to bending and breakage. To prevent damage to the equipment there exist several embodiments of cushion and spring release hitches for one-point attachments, but these are unsuitable for attachment to two or three couplers of three-point hitches for pulling wide implements, for the following reasons In a three-point hitch attachment the bending moment created by an obstruction at one end of the implement would result in a strong force on the near-side coupler and release it, but the far-side coupler would then continue to drag the implement along at a slant, immediately resulting in damage.

It is, accordingly, an object of the present invention to provide the two lower couplers of a three-point hitch on an agricultural tractor, and more especially rapid attachment couplers, with overload release devices. Another object is to interconnect these devices in such a manner that whenever one of the couplers releases the linkage member of the pulled implement due to local overload, the other of the two lower couplers is, simultaneously and automatically, made to release its respective linkage member, so that the implement remains attached only to the upper, centre hook of the three-point hitch and can slide over the obstacle or whatever had been the cause of the overload. Yet another object is to provide means for adjusting the resistance of the couplers to the force designated as actuating the quick release.

The invention consists of an overload release mechanism for a coupling device of the kind known as a three-point hitch, for linking a tractor and an agricultural implement, where each of the two lower coupling members of the tractor which normally engage with corresponding linkage members on the implement, is provided with retaining means viz. a lever having a fixed fulcrum and a surface serving to retain the linkage member of the implement, the two levers being connected together by force-transmitting means to a quick-release device in such a way that an overload acting on either of the two retaining levers trips the said quick-release device and that thereby the retaining force of both levers is reduced so as to release the corresponding linkage members of the implement.

The quick-release device may consist of any suitable device known in the art, viz. a helical spring, a magnet, or a pressure relief valve for liquid or gas, or combinations thereof, and it may be provided with means for adjusting its resistance to a permissible load imposed upon it by the pull of the drawn implement throught the retaining levers and the force-transmitting means. The quick-release device is attached to the transmitting means in such a way that after having been tripped by one side it automatically and immediately releases the pressure on the other coupler, thus cancelling the linkage of the implement on both sides.

In one preferred embodiment of the invention, which uses a non-compressible liquid for the transmission of force, each of the two couplers is provided with a retaining lever rotatable about a fixed fulcrum, one arm of each lever retaining the corresponding linkage member of the implement, the other being connected to a piston movable in a power c cylinder, the respective pressure sides of the two power cylinders being interconnected by piping which, at a point intermediate between the power cylinders, contains an adjustable pressure relief valve. The pressure relief valve opens as soon as the pull on one or both of the couplers exceeds certain preset value, and the arm of the respective retaining lever or levers is or are pulled back a short distance, thereby pushing in the piston of the power cylinger and increasing the liquid pressure therein. The pressure relief valve is preferably of the type which stays open until the pressure in the system has been completely released, so that both retaining levers turn rapidly on their fulcrums until the linking members of the implement have been uncoupled. The pistons are re-pressurized by means of a closed storage vessel connected at its bottom end through a non-return valve to the piping linking the two cylinders, while pressure on the liquid contained in the storage vessel is maintained by compressed air supplied to it initially from an outside source and replenished as and when the need arises. The pressure thus generated forces the liquid into the system, pushing the pistons and the attached levers into the former position. This return action may be improved by weak return springs fitted into the piston.

Figure 1:
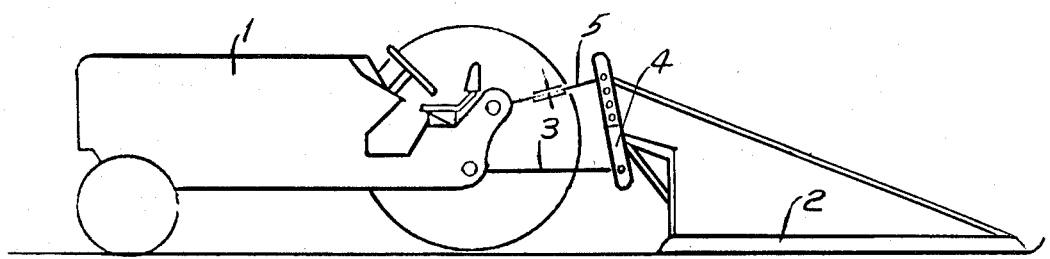
FIG. 1 shows a conventional three-point hitch connecting a smoother to a tractor.
Figure 2:
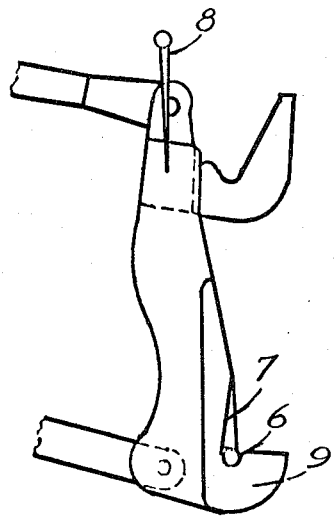
FIG. 2 shows a known-rapid-attachment coupler for a three-point hitch.

FIGS. 1 and 2 describe the prior art in order to facilitate an understanding of the additions and alterations constituting the present invention.

In FIG. 1 a smoother 2 is attached to a tractor 1 by a three-point hitch consisting of two bottom tension links 3, an upright adjusting bar or mast 4, and an adjustable top compression link 5.

The three-point hitch shown in detail in FIG. 2 is used for the rapid attachment of the implement. To accomplish this the coupler is hydraulically lowered, the tractor is backed towards the implement, and the coupler (of the tractor) is engaged with the connecting pins (of the implement). When the coupler is raised once more, it raises the implement together with it. In order to prevent the disengagement of the pins 6, which are integral with the implement, from the lower-point hooks 9, spring-retained pawls 7 are provided above the lower pins, said pawls moving out of the way when the pins engage the hooks and snapping back as soon as the pins are in position. To disengage the pins, the pawls are withdrawn by means of handles 8, the upper parts of which protrude beyond the top of the device.

Figure 3:
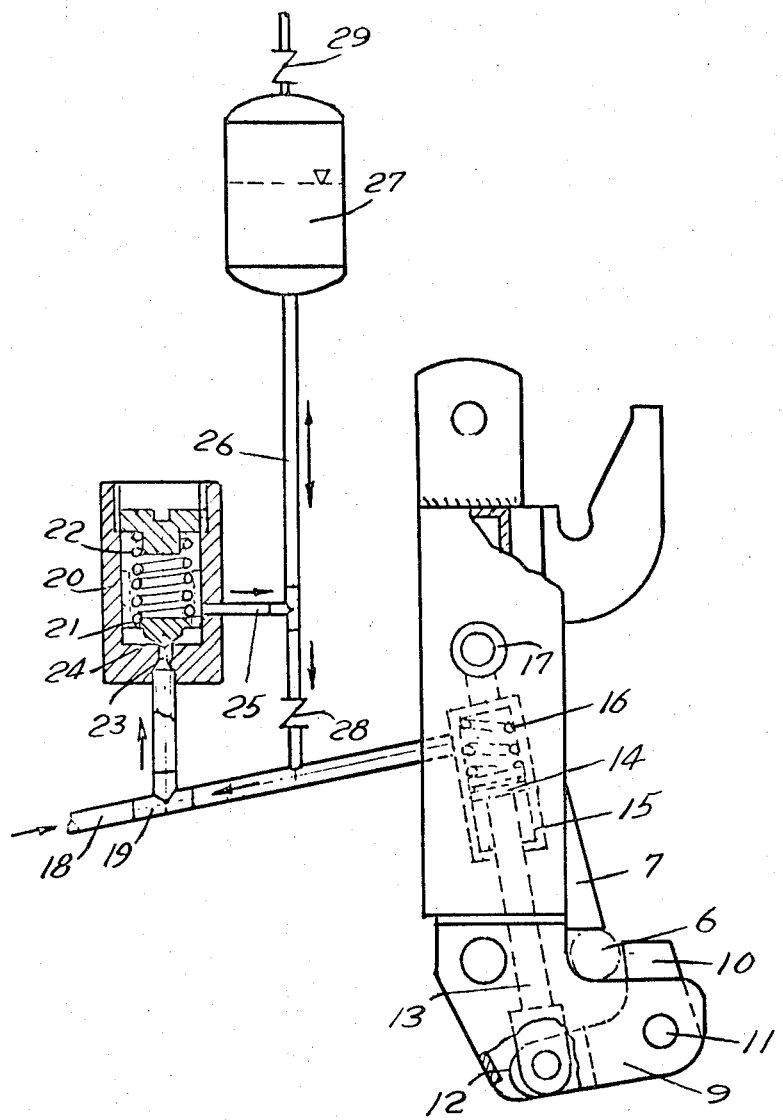
FIG. 3 shows the device of FIG. 2, modified in accordance with the present invention, the load-holding release being hydraulic.
Figure 5:
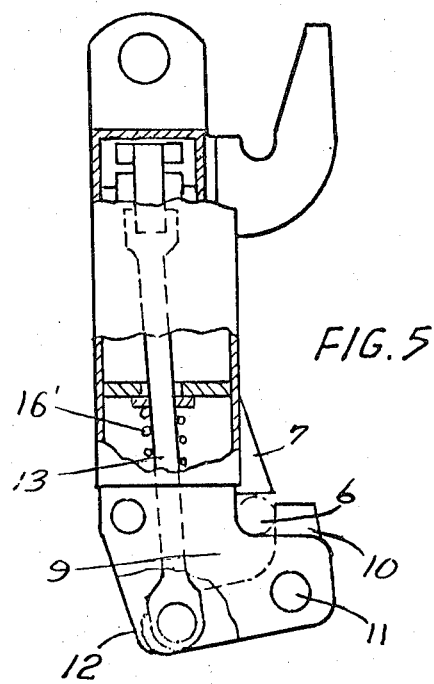
FIG. 5 is partly a side view and partly a section of the device shown in FIG. 4.

FIG. 3 and FIG. 5 shown the additions and alterations made to hooks 9 as shown in FIG. 2, in order to adapt the couplers for automatic release. The portion of the hook bearing the drawn load is replaced by an angular lever 10 supported on a pin-shaped fulcrum 11: The vertical arm of the lever 10 serves as the load-bearing face of the hook for pin 6, while the horizontal arm of the lever 10 is acted upon by the retaining force through a substantially vertical rod 13, hingedly connected to the lever by a pin 12. The right-hand and the left-hand coupling points of the hitch are identical, and up to this point the mechanisms for the hydraulic and the magnetic retention of the lever are also identical. The same mechanism is also applicable to the spring-operated device shown in FIGS. 6 and 7.

Referring now to the hydraulic device shown in FIG. 3, rod 13 is provided at its upper end with a piston 14, which is slidingly inserted in a cylinder 15. A weak helical spring 16, shown in this embodiment inside the cylinder atop the piston, normally keeps the latter in its lowest position. The cylinder is connected to the body of the hitching mechanism by means of a pin 17, about which it can swing in accordance with the demands of the movement of lever 10. The upper, pressure side of the cylinder is hydraulically connected by a tube 18 to the pressure side of the identical cylinder of the mechanism provided on the other coupler of the hitching device (not shown in the drawing). At a position on tube 18 about midway between the cylinders a T-piece 19 connects the tube 18 to a pressure-relief valve 20 of known design. The latter is provided with a stepped piston 21 pressed downwards by an adjustable helical spring 22, whereby the small-diameter valve seat 23 is closed by valve cone 24. The outlet 25 is divided into two branches, one, through another pipe 26, leading to a storage and pressure vessel 27, and the other branch leading back to connecting pipe 18 through a check valve 28. The storage and pressure vessel is filled with oil or any other suitable pressure fluid, and its upper part is provided with an inlet through a check-valve 29, which may be connected to a compressed-air supply for introducing or replenishing pressure in said pressure vessel.

The mechanism is so adjusted, by means of valve spring 22, that the pressure acting on pistons 14 holds the pins 6 and with them the implement in position as long as the normal traction force is not exceeded. Should the implement meet an off-center obstruction, which results in a local force at one end only, the load-bearing part of lever 10 on the side of the obstacle gives way and pushes piston 14 up against the oil pressing on it. This increases the oil pressure until relief valve cone 24 is lifted off its seat. The piston 14 then moves upwards against a much lower pressure owing to the much larger surface of the relief valve piston 21 now exposed to attack by the hydraulic fluid. When piston 21 reaches the outlet opening, hydraulic fluid spills into pipe 26, upon which the pressure in the whole system becomes sufficiently low to allow both levers 10 on either side of the implement to release the pins of the implement, which now tilts up because it remains connected only to the upper hook of the three-point hitch. The implement can thus pass over the obstacle.

As soon as the pull on the retaining levers has ended, relief valve piston 21 returns, under pressure from spring 22, closing relief port 23 and outlet 25. In this position the air pressure inside pressure vessel 27 pushes the hydraulic fluid back to the power cylinders 15 through the check valve 28, thereby pushing the pistons 14 downwards and returning the levers 10 to their original position. This latter action may be assisted by the provision of a spring 16 inside cylinder 15 or at any other suitable location. This spring also ensures operation in the case of loss of pressure inside pressure vessel 27.

Figure 4:
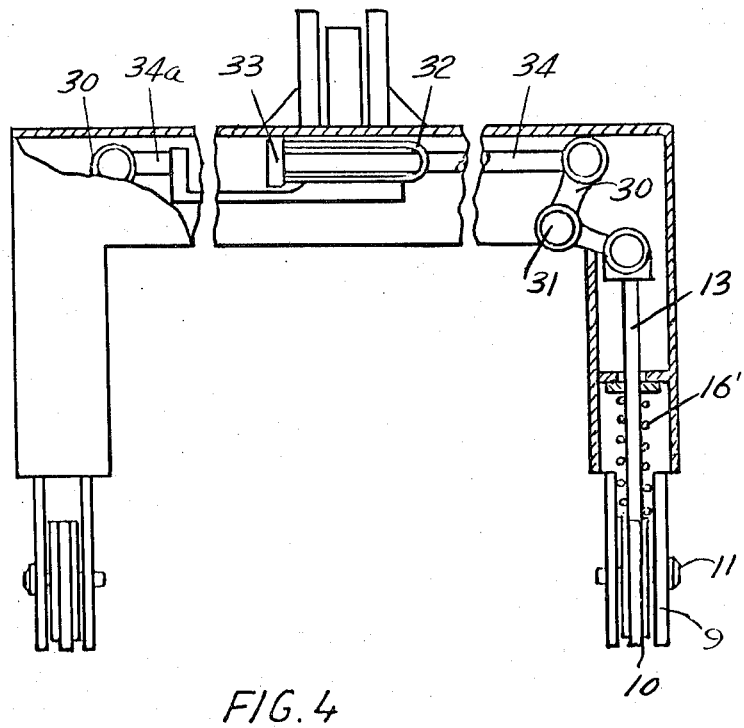
FIG. 4 is another modification of FIG. 2 in accordance with the present invention, load holding and release being magnetic.

In another preferred embodiment, the hydraulic system is replaced by a magnetic device such as is shown in FIGS. 4 and 5. Herein the rods 13, which are hingedly connected at their lower ends to the levers 10, have their upper ends hingedly connected to the angular levers 30, which have the pins 31 as their fixed fulcrums. The other ends of these levers are hingedly connected to rods 34 and 34a, which form the extensions, respectively, of an armature 33 and a permanent magnet 32. As shown in FIG. 4, the magnet 32 is connected to rod 34a, while the armature 33 forms the end of rod 34, so that in the normal, closed position of magnet and armature the vertical arms of levers 10 are in the holding position.

Whenever the backward pull of the drawn implement on one of the pins 6 increases in excess of the allowed limit, the vertical arm of the corresponding lever 10 is forced backwards, and the said excessive pull is transmitted to either the magnet or the armature, thereby separating the two, through over-coming the magnetic induction forces. As soon as permanent magnet 32 and armature 33 are separated the only forces acting on levers 10 are the relatively weak forces of the return springs 16', permitting the complete tilting of the levers and freeing the pins 6 of the implement on both sides. As in the mechanism described in FIG. 3, the implement remains hooked to the upper, central, coupler hook, but it is enabled to tilt somewhat and can thus slide over the obstruction. As soon as the pins 6 have been freed, the springs 16' return the mechanism to its original position, and the implement can be hooked up again completely by lowering the hitch and backing up the tractor for the reengagement of the couplers.

Figure 6:
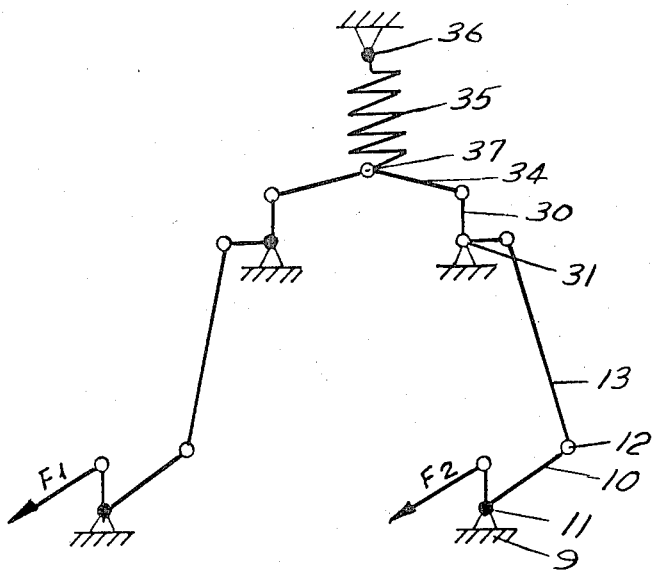
FIG. 6 is a diagrammatic view of an arrangement of the couplers with a spring serving a load retainer shown in the loaded position.
Figure 7:
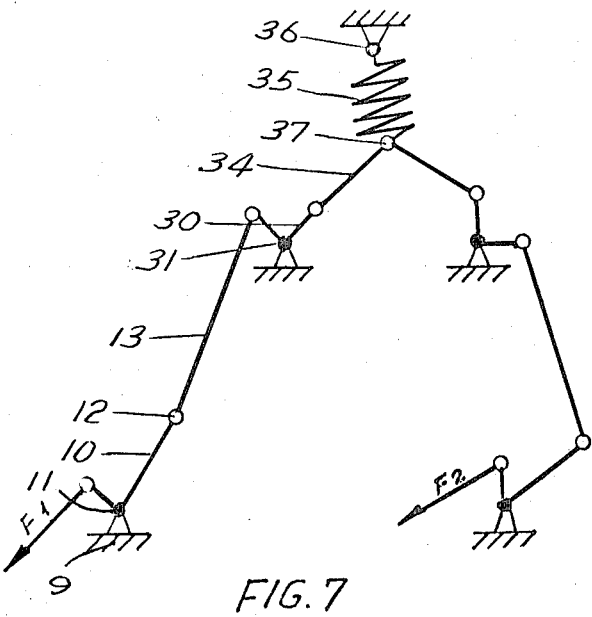
FIG. 7 is a diagrammatic view of the device shown in FIG. 6, but with one of the couplers in the released state.

FIGS. 6 and 7 show, in diagrammatic form, another mechanism for the subject purpose, viz. with the retaining force obtained mechanically by means of a compression spring 35. The upper end 36 of the compression spring 35 is fixed to a rigid part of the hitch structure, while the lower end of that spring is attached to a hinged joint 37 linking the two connecting rods 34. The said rods are hingedly connected together at point 37 and form a large obtuse angle of nearly, but not equalling, 180°. The traction forces $F_1$ and $F_2$ are counterbalanced, through the angled levers 10, connecting rods 13, and the angled levers 30, by the mutual opposition of the rods 34 and by the force of spring 35.

FIG. 7 shows the action of an overload $F_1$ on one of the levers 10, whereby the left-hand rod 34 moves point 37 upwards and to the right, thus compressing spring 35 and increasing the angle between the upright arms of the respective levers 30 and rods 34, so that the forces on both angular levers 30 are greatly reduced, although the counterpressure of the compressed spring 35 increases. Due to the reduction of the forces acting on the angular levers 30, both levers 10 give way to the traction force and release the pins of the implement in very rapid succession. All parts return to their original positions as soon as forces $F_1$ and $F_2$ cease to act, and the implement may be hooked up again.

The preceding examples describe the various preferred embodiments of the principle of the invention. It will, however, be understood that many variations in the specific embodiments described may be made by those skilled in the art without departing from the scope of the invention. It is accordingly intended that this specification be construed as illustrative and not in a limiting sense.

I claim:

1. Overload release mechanism for a three-point hitch to link a tractor with an agricultural implement, said tractor having spaced coupling members secured thereto adapted to be engaged by matching engagement members on the implement;

the coupling members on the tractor including quick-release retaining means to retain said engagement members in the coupling members up to a predetermined force between the engagement member and the coupling means and then release the engagement member;

a lever forming part of each of the spaced retaining means and engaged by the engagement members;

and force transmission means interconnecting the levers of the retaining means of the spaced coupling members, so that, upon overload acting on either of the coupling means, causing one of said quick-release retaining means to trip, the retaining force of both levers is reduced and both corresponding engagement members of the implement are released.

2. Mechanism as claimed in claim 1, wherein the force transmission means comprises a non-compressible liquid;

the lever of each of the two couplers being formed as a retaining lever rotatable about a fixed fulcrum;

one arm of each respective lever retaining the corresponding engagement member of the implement;

a respective piston connected to the other arm of each respective lever;

a respective power cylinder within which the respective pistons are slidable;

and pressure conduit means interconnecting the respective pressure sides of the power cylinders.

3. Mechanism according to claim 2, comprising an adjustable pressure relief valve hydraulically connected at a point intermediate the power cylinders.

4. Mechanism as claimed in claim 3, comprising a pressurized storage vessel, the upper part thereof being filled with compressed air and the lower part with said liquid;

a check valve;

and connection means arranged between the lower part of the vessel and the conduit means connecting the two power cylinders through the check valve on the one hand and the outlet of the pressure relief valve on the other hand.

5. Mechanism as claimed in claim 4, comprising a weak spring inserted in each power cylinder to exert a force in direction of the force applied thereto by the liquid under pressure.

6. Mechanism as claimed in claim 1, wherein the force transmission means comprises linkage means connected to said levers, and a magnet and armature connected to respective linkage means and interconnecting the linkage means connected to said levers, said levers and linkages forming lever arms, the proportions of the lever arms and the magnetic force between the magnet and the armature being balanced such that the magnet and the armature are separated from each other by overload acting on either of the two coupling means and hence on said levers due to excessive pull exerted on either of the retaining levers, to effect joint release of both levers upon force being exerted against one lever.

7. Mechanism as claimed in claim 1, wherein the force transmission means comprises a system of linkages connected to said levers, and spring means having one end bearing against the linkages, the spring means being located with respect to the linkages to provide a snap or toggle action upon application of excessive force on either of the retaining means, the spring means permitting movement of the links of the linkage system to effect release of the other retaining means upon release of one of said retaining means.

8. Mechanism as claimed in claim 1, wherein the respective levers on the respective quick-release retaining means are swingable about a fixed fulcrum and having a surface retaining the engagement members of the implement, said levers being biassed to hold the engagement members in the coupling members.

* * * * *